United States Patent [19]
Ueberreiter et al.

[11] Patent Number: 5,920,641
[45] Date of Patent: Jul. 6, 1999

[54] METHOD FOR RECONSTRUCTING LINEAR STRUCTURES PRESENT IN RASTER FORM

[75] Inventors: Birgit Ueberreiter, Neubiberg; Joachim Dengler, Neckargemund, both of Germany

[73] Assignee: Siemens Nixdorf Informationssysteme Aktiengesellschaft, Paderborn, Germany

[21] Appl. No.: 08/809,195

[22] PCT Filed: Sep. 6, 1995

[86] PCT No.: PCT/DE95/01210

§ 371 Date: Mar. 6, 1997

§ 102(e) Date: Mar. 6, 1997

[87] PCT Pub. No.: WO96/07976

PCT Pub. Date: Mar. 14, 1996

[30] Foreign Application Priority Data

Sep. 8, 1994 [DE] Germany .............. 44 32 002

[51] Int. Cl.$^6$ ....................... G06K 9/00
[52] U.S. Cl. .............. 382/125; 382/115; 382/118; 382/119; 382/124; 382/126; 382/128; 382/173; 382/177; 382/179
[58] Field of Search ................ 382/115, 118, 382/119, 124, 125, 126, 128, 173, 177, 179

[56] References Cited

U.S. PATENT DOCUMENTS

| | | | |
|---|---|---|---|
| 4,817,183 | 3/1989 | Sparrow | 382/4 |
| 4,881,177 | 11/1989 | McClean et al. | 364/513 |
| 4,947,442 | 8/1990 | Tanaka et al. | 382/5 |
| 4,953,018 | 8/1990 | Martens | 358/133 |
| 5,465,303 | 11/1995 | Levinson et al. | 382/124 |

FOREIGN PATENT DOCUMENTS

0 551 086 A2  7/1993  European Pat. Off. .

OTHER PUBLICATIONS

$9^{th}$ International Conference on Pattern Recognition, IEEE (1988), vol. 1, Danielsson et al, Rotation–Invariant Operators Applied to Enhancement of Fingerprints, pp. 329–333.

Mathematical Imaging: Wavelet Applications in Signal and Image processing, SPIE vol. 2034, (1993), Ronald R. Coifman, Adapted Waveform Analysis, Wavelet–Packets and Local Cosine Libraries as a Tool for Image Processing, pp. 2–12.

Mustererkennung (1990), Joachim Dengler et al, The Pseudo–Logarithmic Transformation for Bobust Displacement Estimation, pp. 275–281.

IEEE Technical Report (1990), William T. Freeman et al, Steerable Filters for Early Vision, Image Analysis, and Wavelet Decomposition, pp. 406–415.

Computer Vision, Graphics, and Image Processing, M. Hashimoto et al, Multiple–Order Derivatives for Detecting Local Image Characteristics, pp. 28–55.

Computer Vision, Graphics, and Image Processing, Michael Kass et al, Analyzing Oriented Patterns, pp. 362–385.

Transactions on Pattern Analysis and Machine Intelligence, vol. 14, No. 6, Jun. 1992, Jan J. Koenderink et al, Generic Neighborhood Operators, pp. 597–605.

Home Office Police Department, Police Systems Research and Development Group, Publication No. 1, (1993), Barry Blain, An Introduction to Fingerprint Automation, pp. 1–24.

*Primary Examiner*—Leo H. Boudreau
*Assistant Examiner*—Kanji Patel
*Attorney, Agent, or Firm*—Hill & Simpson

[57] ABSTRACT

Linear structures are used to identify persons. In order to be able to combine a multiplicity of such linear structures in a database, their original images are analyzed and reconstructed using orthonormal basic functions. A preferred direction of the linear structure is determined for each pixel. A quality measure is used to evaluate the reliability of the analyzed data. Singularities (SI) and minutiae (MI) are extracted and stored.

26 Claims, 10 Drawing Sheets

METHOD FOR RECONSTRUCTING LINEAR STRUCTURES PRESENT IN RASTER FORM

BACKGROUND OF THE INVENTION

The invention relates to a method for reconstructing linear structures present in raster form. Such linear structures can be used to identify persons. In order to identify persons, use is usually made of their fingerprints, but also of other linear structures such as those of the retina, the vascular plexus of the retina of the eye. Use can also be made of the linear structure in the iris of the human eye for the purpose of a unique identification of a person.

In order to be able to use the said linear structures to identify persons, a multiplicity of such linear structures must be combined in a database. A linear structure of a person to be identified is then compared with the content of this database. In the meantime, ever more voluminous collections of linear structures are exceeding the possibilities for carrying out visual comparisons in an acceptable time. However, because of the rapid developments in the fields of storage media and the techniques of digital image processing, tools are available which permit the design of powerful recognition systems.

Barry Blain, Introduction to Fingerprint Automation, Home Office Police Department, Police Systems Research & Development Group, Publication No. 1/93, 1993 discloses a method by means of which the line directions can be determined. In order to determine the line direction, the image is parqueted into slightly overlapping subregions with a size of 20×20 pixels, four to six pixels overlapping at the edge of the subregions. After determination of the direction, which is performed by regional Fourier transformations, a directional smoothing with subsequent binarization is undertaken. The threshold values for the binarization are determined by histograms in the subregions. The binary image thereby produced still contains prominent defects, which are later corrected by means of diverse consistency criteria. It is not always possible to expect an error-free correction of the defects, for example the merging of regions which do not belong together, or the separation of lines.

In order to achieve a high processing rate in the recognition of linear structures, the storage of essential information such as, for example, the precise position and shape of lines as well as their thickness, is frequently dispensed with during the storage of linear-structure data. Moreover, the linear structures to be coded are frequently present only in a reduced image quality. In subregions, the image is for example blurred or has insufficient contrast. In the case of coding in accordance with the prior art, the linear structure in such regions is estimated. However, it is then no longer possible to recognise from the stored binary image of the linear structure the degree of reliability with which the individual image sections were generated from the basic image pattern.

SUMMARY OF THE INVENTION

It is the object of the present invention to specify a method for reconstructing linear structures present in raster form, in which a reliable linear-structure coding which retains all the essential information of a linear structure is achieved in conjunction with as little computational outlay as possible.

By contrast with known automatic recognition systems for linear structures, in the method according to the invention essential information such as, for example, the precise position and shape of lines as well as their thickness is not dispensed with. By applying the method steps, the real linear structure is transformed into an ideal model with a locally parallel, one-dimensional linear structure, the ideal model being applied separately for each pixel. Conclusions can be drawn on the reliability of the ideal model at each pixel with the aid of the vector coefficients, which are determined as a response characteristic. The vector coefficients permit compact storability of the linear structure.

In accordance with a development and refinement of the method according to the invention, smoothing of the vector coefficients determined is carried out. A smoothed variation in the preferred direction of lines is thereby achieved.

In accordance with a development and refinement of the method according to the invention, the method is repeated by means of at least a second binomial function $A(x,s)$ which is assigned to a different magnitude scale. Various reconstructions of the original linear structure are then present.

In accordance with a development and refinement of the method according to the invention, the respectively best reconstruction result for each pixel is selected by means of generating a weighting function, the respective selection result being stored in a memory as a grey-scale image and as a directional distribution. The best reconstruction is thereby selected from the various reconstructions of the original linear structure for each pixel. The width of the lines and their mutual spacing in the ideal model can be varied thereby. There is thus a refinement of the ideal model.

In accordance with a development and refinement of the method according to the invention, the absolute value of each vector coefficient is formed and is stored in the form of a quality map. A measure of quality is thus available for each pixel. This measure of quality can, on the one hand, be used later to establish the reliability of the linear structure. On the other hand, characteristic features of the fingerprint can be determined with the aid of the quality map. Smoothing of the measure of quality, produces coherent regions of good quality, such as corresponds to the sensitivity of the human eye.

In accordance with a further development and refinement of the method according to the invention, segmentation of the reconstruction result is undertaken by means of threshold-value treatment of the quality map, in which all the pixels having a quality which is higher than a threshold value are assigned to a valid linear structure. The existence of the linear/valley structure in an image region can thereby be recognized in a simple way.

In accordance with a further development and refinement of the method according to the invention, singularities are determined from the directional field with the aid of a method based on the theorem on winding numbers. Checking of the existing directional information in the environment of a singularity is performed, in order to check the authenticity of the singularity. The authentic singularities can thus be recognized and stored in a simple way.

In accordance with a further development and refinement of the method according to the invention, a binary image is generated from the grey-scale image, by means of a reconstruction of all the pixels, by setting the limiting value for distinguishing between white and black at the grey-scale value of 0. By comparison with the grey-scale image, such a binary image requires little storage space and can be outlined, with the result that the line width is reduced in steps to the width of a pixel. In a sequential selection of pixel image sections, of size 3×3 pixels each, minutiae can be recognized from the binary image outlined in this way. During comparison of the pixel image sections, these branchings or line ends are recognized by means of pixel patterns of the same size which contain the structures under search. The associated pixel coordinates and the type of the minutiae are stored for later use in the event of a positive result of comparison. The reliability of the found minutiae can be determined with the aid of an evaluation of the line quality in the close environment of the minutiae.

In accordance with a further development and refinement of the method according to the invention, at the start of the method, contrast enhancement of the image information present in raster form is undertaken by means of psuedologarithmic transformation. Optimum conditions are thus created for the further method steps.

It is thus possible even for fingerprint data to be filtered with spatially variant, one-dimensional directional filters by means of the method according to the invention, that is to say by the use of the ideal model. These filters have a close relationship to Gabor filters. The spatial variance with respect to direction and dimension is achieved by linear superposition of a number of spatially invariant filters. The same filters are used in order to determine the smoothed directional field and the relevant region of the total image. The response characteristic relating to the basic function is also used for the purpose of calculating a measure of quality for each pixel. This concept is possible on the basis of the controllability and the orthonormality of the elementary basic functions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
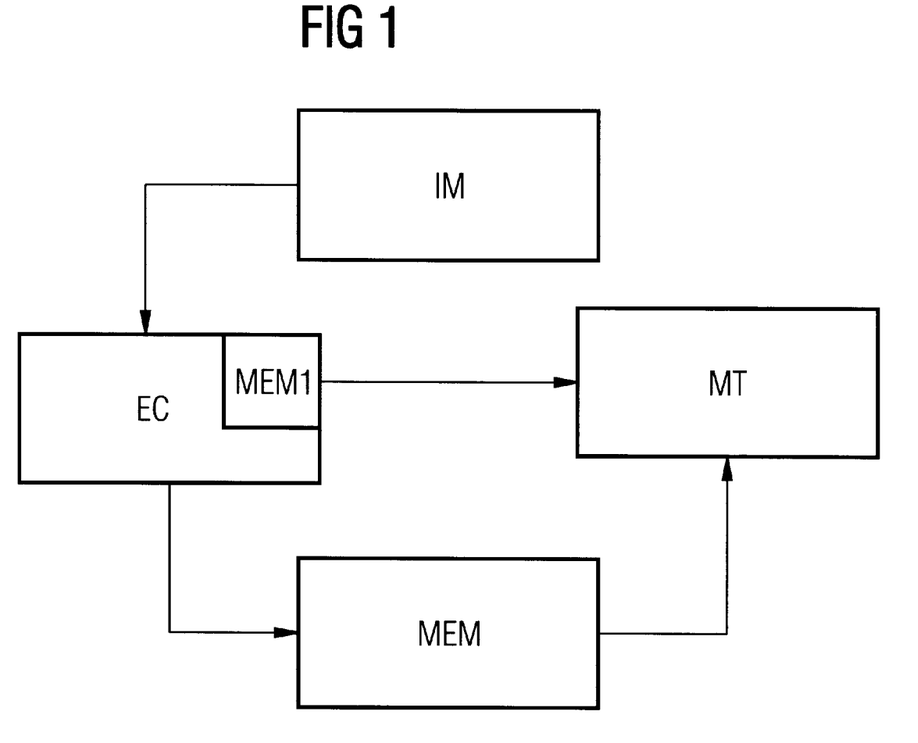
FIG. 1 shows a block diagram of a fingerprint recognition system.
Figure 2A:
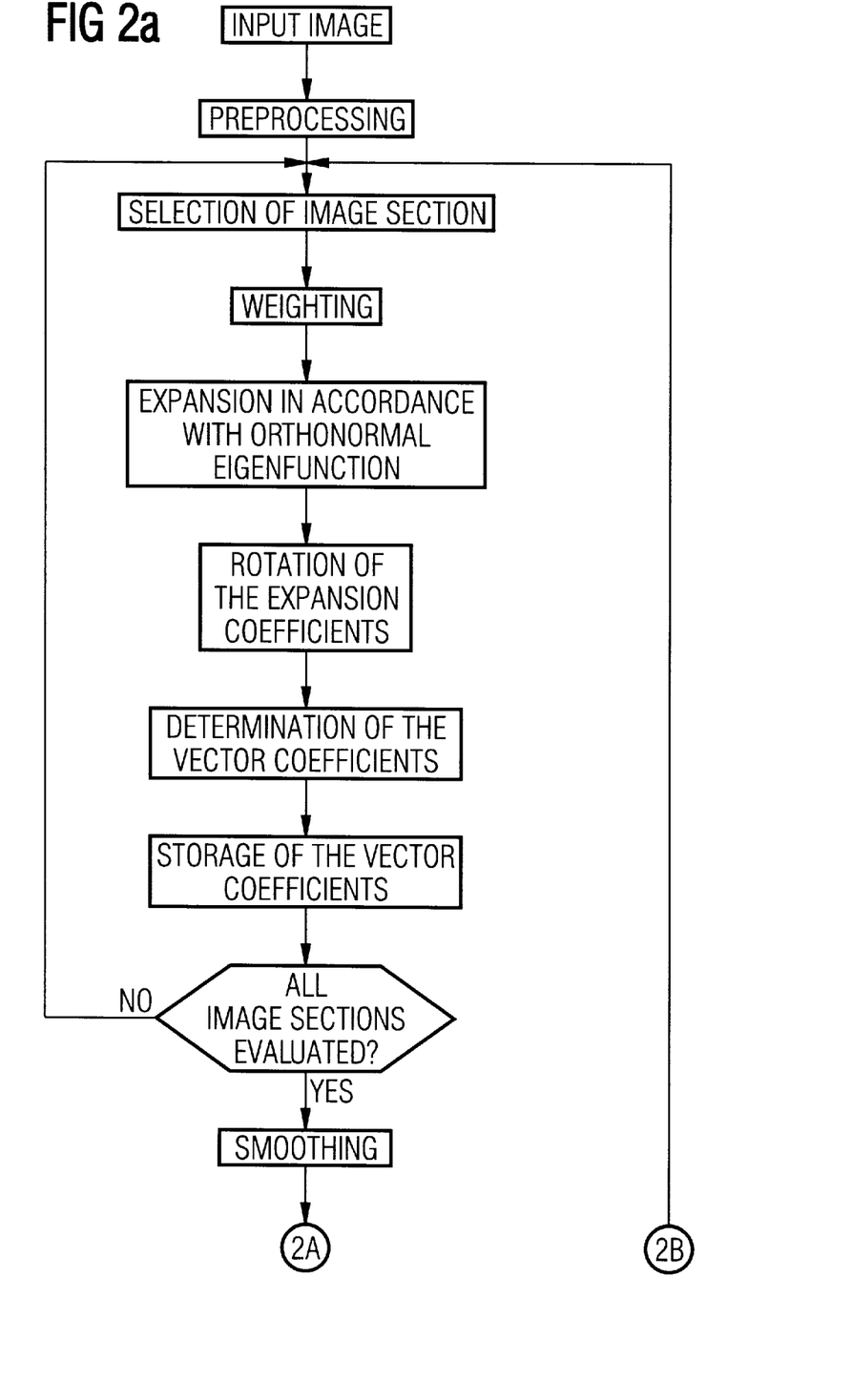
FIG. 2 shows a block diagram of the method sequence.
Figure 2B:
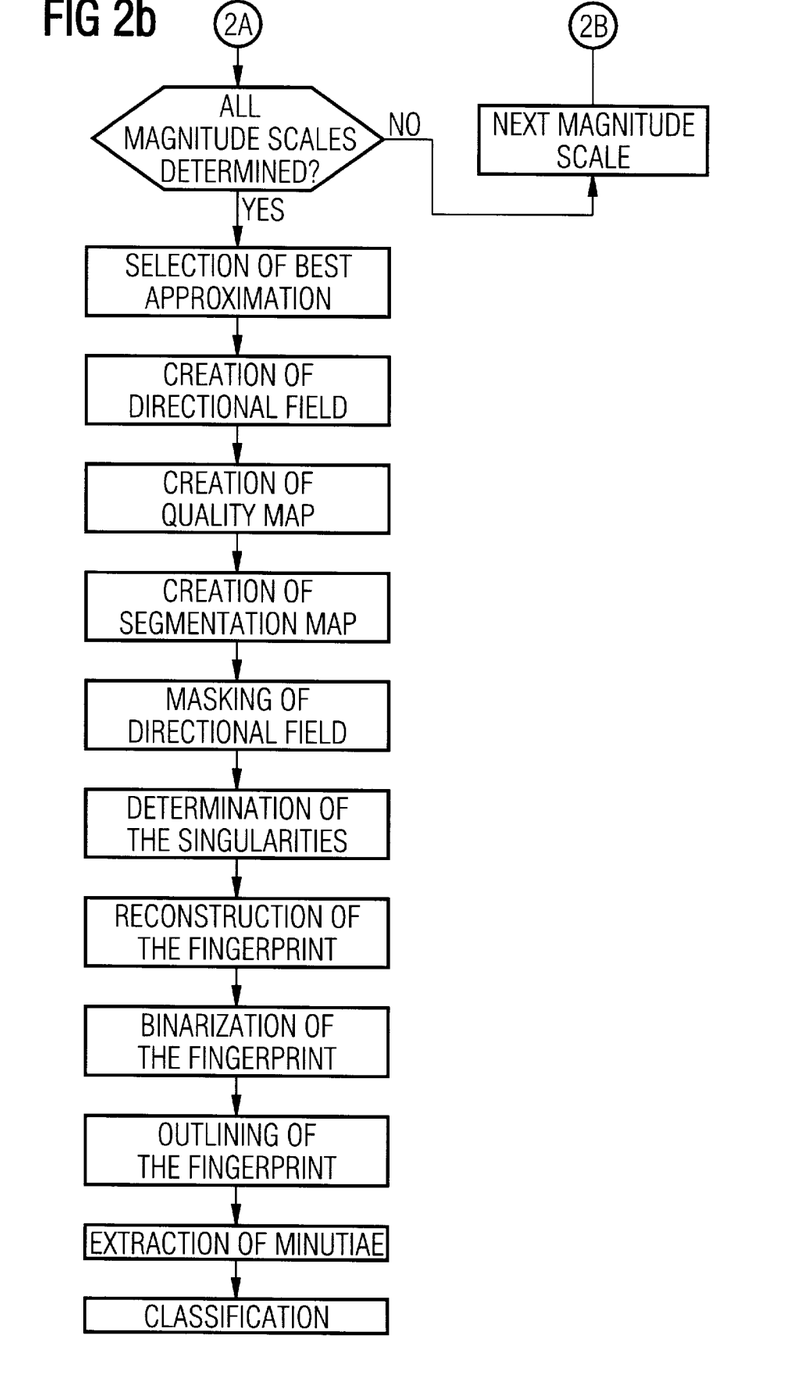

The block diagram in accordance with FIG. 1 shows the essential components of an automatic fingerprint recognition system. An image IM of a fingerprint, which has been read-in by a scanner and converted into a rasterized, two-dimensional item of grey-scale information is transferred to a coding device EC. In a way to be described later, the image IM is conditioned there into the form of data which can be used for automatic fingerprint recognition. If these data are to be available for later comparison processes, they are stored in a memory MEM which serves as database. If, however, the data are to be used only for one comparison process, it is sufficient for them to be stored in a memory MEM1 assigned to the coding device EC. If required, the data can also be stored in the two memories MEM, MEM1. The data contained in the memories MEM, MEM1 can be compared with one another with the aid of a comparator MT, which is coupled to the memories MEM, MEM1.

As a first step, the aim now is to explain the considerations on which the coding is based by means of a local image model.

The One-dimensional Continuous Theory

The core of the theory is the approximation by means of which the two-dimensional grey-scale image information is simulated locally. This is performed by means of a set of basic functions which fulfil the required conditions in an optimum way and in so doing are calculable to a high degree. It has been shown under very general preconditions in "Generic Neighbourhood Operators", J. J. Koenderink, A. J. Doorn, IEEE Transactions on Pattern Analysis and Machine Intelligence, pages 597–605, 1992, that an optimum set of generic, that is to say problem-independent, image operators for the continuous domain has the following one-dimensional form:

$$\Psi_n(x, s) = \left(\frac{1}{\sqrt{4s}}\right)^n \Phi_n(\xi) A(x, s)$$

where $\Phi_n(\xi)$ are the orthonormal eigenfunctions of the Schrödinger equations for the quantum-mechanical harmonic oscillator with the Hermite polynomials $H_n(\xi)$:

$$\Phi_n(\xi) = \frac{H_n(\xi) e^{-\frac{\xi^2}{2}}}{\sqrt{2^n n! \sqrt{\pi}}}$$

The scale-independent variable $\xi$ is defined as $$\xi = \frac{x}{\sqrt{4s}}$$

and $A(x,s)$ is a window function of the range of the scale s which masks the section to be modelled:

$$A(x, s) = \frac{e^{\left(-\frac{x^2}{Bs}\right)}}{\sqrt{B\pi s}}$$

The image operator $\Psi_n(x,s)$ can be interpreted such that a local image section, which is defined by $A(x,s)$ and weighted, is expanded in accordance with a scale-independent orthonormal basis of the orthonormal eigenfunctions $\Phi_n(\xi)$ which define the local image structure.

On the other hand, the image operator $\Psi_n(x,s)$ is identical, but for a constant factor, with the nth derivative of the operator of zeroth order. This permits the application of the image operator $\Psi_n(x,s)$ to be referred to as a Gaussian-weighted derivative operator.

The Model in the Discrete Domain

The image processing is typically performed in a discrete raster and not in the continuum. In order to put the concept into practice, it is necessary to formulate the theory for the one-dimensional continuous domain at least approximately in the discrete domain, without losing the decisive properties. This has not been possible to date.

In particular, the aim is to fulfil the condition of orthonormality in the discrete domain. A few other details such as, for example, the constant coefficients can, however, be sacrificed, in order to render the discrete theory consistent. The most obvious approximation, specifically to scan the continuous filter functions at discrete points, does not achieve the aim. Going down this path destroys the orthonormality, and filters such as, for example, the Laplace operator, whose impulse response should be free of the mean value, no longer have this important property.

The key to the discretization is the approximation of the Gaussian core by binomials, which are known to represent the best possible discrete approximation to the Gaussian function. In particular, there are corresponding scaling properties: whereas, in the case of folding with a Gaussian core, a Gaussian core in turn produces a Gaussian core, in the case of binomial coefficients the same recursion is produced as the result of the propagation in the Pascal triangle: explicitly, for example, the folding of two binomials of 2nd order produces $121 \otimes 121 = 14641$. It holds in general that: $B_n \otimes B_m = B_{n+m}$. Consequently, the discrete weighting function and the basis of zeroth order are completely determined by the requirement for an identical variance of the Gaussian and the binomial distributions, which is characterized by the following simple relationship:

$$s = m/2$$

where s is a continuous scale parameter of the Gaussian core (see above) and m is a discrete order of the binomial.

The higher orders of the discrete versions are determined by making use of the circumstance that the image operators $\Psi$ can be interpreted as a derivative but for a constant. In the discrete case, the derivatives are determined by least-square estimation of corresponding Taylor coefficients in binomially weighted data. A method for simple and efficient determination of these discrete derivatives is described in M. Hashimoto and J. Sklansky, "Multiple-order derivatives for detecting local image characteristics", Computer Vision, Graphics and Image Processing, 39: pages 28–55, 1987.

These measures guarantee the orthogonality of the fundamental discrete basis. Orthonormality is achieved by the explicit requirement of numerical standardization.

In order to achieve a conclusive and simple formulation, the continuous formulae are further used below. However, the discrete transformations described above must be used in the application.

2D-generalization

The two-dimensional (2D) generalization is also described in the above-named publication of Generic neighbourhood operators, 1992. There are three different representations in two dimensions, of which each has its own special properties. All these representations can be transformed into one another by simple unitary algebraic transformations. This can be achieved in a simple way by considering the fact that the eigenfunctions of the harmonic oscillator define a Hilbert space in which each orthonormal coordinate system can be transformed into another by rotation.

1. The Cartesian separable representation is the most interesting with regard to calculability, because the application of the 2D-operator can be decomposed into the application of two one-dimensional (1D) operators:

$$C_{pq}(x,y,s) = \Psi_p(x,s) * \Psi_q(y,s)$$

Figure 3:
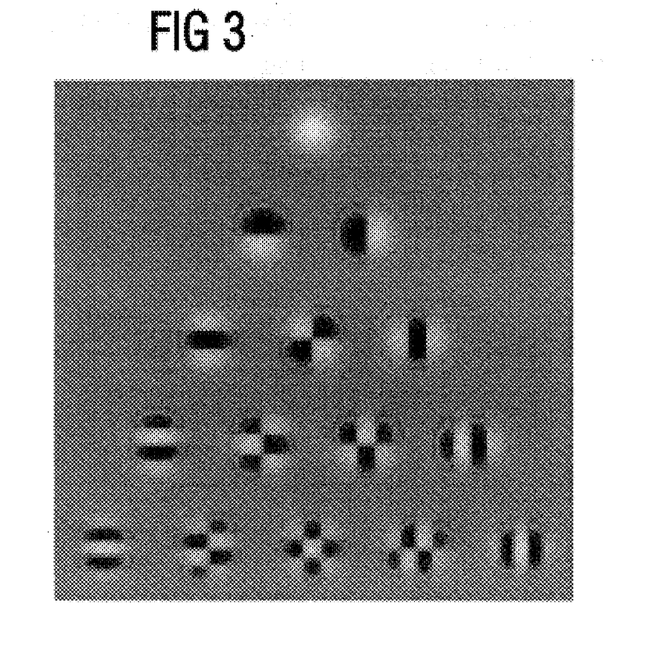
FIG. 3 shows a set of Cartesian basic functions.

The different operators are arranged in families of the same order $n = p+q$. These are shown in FIG. 3.

In the case of consideration of a discrete filter mask having an effective size of 20 pixels, the decomposition produces a rise in the efficiency by a factor of 10 (20+20 instead of 20*20 elementary operations).

2. The polar-separable representation is the representation best suited for scaling transformations or rotation transformations, because the scale affects only the radial component, whereas changes in the orientation affect only the angular component.

3. The so-called wavetrain representation is the best suited for application in the case of fingerprint analysis. The members of a family are only rotated versions of the smoothed 1D-directional derivative. By contrast with the two other representations, the individual members are not weighted, orthonormal basic functions. The decisive property is that, for a given order n, the superposition of a set of n+1 prescribed filter operations suffices to generate a directional filter which filters out arbitrary directions. In "Steerable filters for image analysis", W. T. Freeman and E. H. Adelson, Technical Report 126, MIT Media Lab., 1990, this phenomenon is referred to as steerability of such filters. The steerability can be demonstrated by an addition theorem of Hermite polynomials. The wavetrain representation greatly resembles a) Gabor filters, which are used in the prior art of image processing, and b) the response function of the direction-sensitive cells in the brain of higher mammals.

Figure 4:
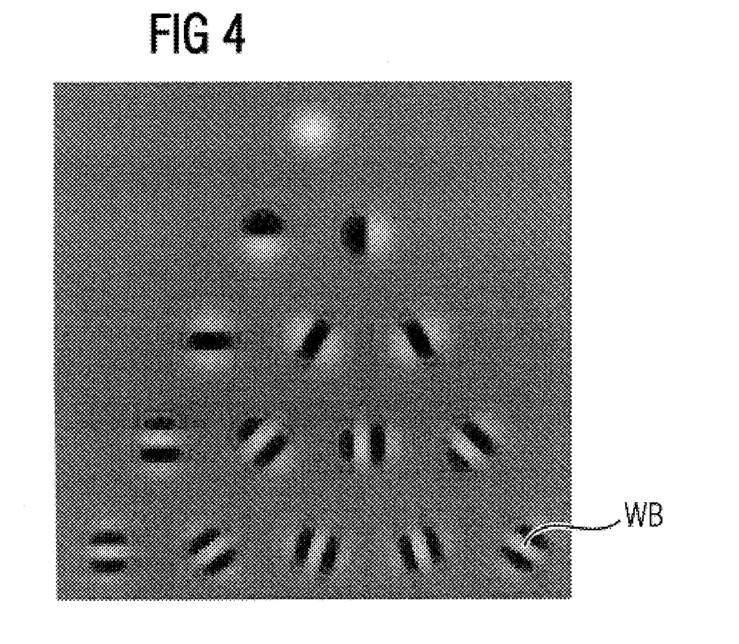
FIG. 4 shows a set of wavetrain basic functions.

The associated wavetrain functions are shown in FIG. 4. The direction-specific character of the wavetrain functions is to be seen in the figure.

The translation of the continuous 2D-theory into the discrete space requires a few considerations. Whereas the scaling response of the resulting basic functions follows directly from the corresponding (continuous) Gaussian bell and (discrete) binomials, the controllability can only be approximated. With the realistic assumption that, given an adequately fine rastering, the deviations between the continuous function and the discrete approximation become negligible, the rotation coefficients, which are used in the continuous domain, are also optimally suitable in the discrete domain. It is clear that it should not be forgotten that the approximation of an arbitrarily rotating discrete basic function is worsened when a relatively low binomial order is present, because the number of the raster points is greater precisely by 1 than the binomial order. For practical applications, the difference between the binomial order and the order of the maximally applicable derivative should be at least 3 to 4, in order to achieve an acceptably good controllability and in order to exclude so-called "Aliasing effects". This also guarantees the required band limitation, which is required in order to prevent modelling noise.

The wavetrains of fourth or fifth order are very well suited as local models of the linear/valley structure for the purpose of use in fingerprint analysis, since they also take account of the two neighbouring lines in the modelling.

Determination of the Optimum Orientation and the Magnitude Scale

Starting from the foundation of a wavetrain base of specific order on a specific magnitude scale, it is to be expected that the absolute response will be more intense when the wavetrain models are in optimum agreement with the linear/valley structure of a fingerprint. When measuring the actual angular response of a continuously rotated wavetrain basic function of, for example, fourth degree, which is applied in the case of a relatively good linear/valley structure, the response approximately obeys a cosine or sine function. Consequently, the squares of the wavetrain basic response functions are projected onto this cosine and sine base with a period of 180°, in order to determine the optimum local alignment, which leads to a directional field whose arc specifies the local orientation. On the basis of the fact that the local alignment changes mostly continuously (and gradually) in the images, the resulting directional field can and should be strongly smoothed.

The determination of the optimum magnitude scale is possible in a similarly simple way. It requires filtering the image with a specific set of filters on all possibly relevant magnitude scales. The optimum magnitude scale is yielded as that whose filter delivers the signal with the highest absolute value. The result is suitably interpolated when few filters are used in the case of fixed scales.

The Quality Measurement

The quality measurement can be best explained using the Cartesian basic functions in the 2D-domain. The multiplication properties which were represented above for the image operator $\Psi$ are valid for the basic function $\Phi$. It is sensible to arrange the 2D-functions in families of degree n, each having n+1 members, which is indicated below with the index k.

A local partial image is expanded on the basis of the orthonormal character of the basic functions $\Phi_{k,n+k}$, in accordance with the base:

$$I(x, y) * A(x, y, s) = \sum_{n=0}^{\infty} \sum_{k=0}^{n} \gamma_{k,n-k} \Phi_{k,n-k}(x, y, s)$$

The coefficients $\gamma_{k,n-k}$ are given by $$\gamma_{k,n-k} = (\sqrt{4s})^n \int\int I(x, y) C_{k,n-k}(x, y, s) dx dy$$

It holds, according to the Parseval theorem, that:

$$\int\int (I(x, y) * A(x, y, s))^2 dx dy = \sum_{n=0}^{\infty} \sum_{k=0}^{n} \gamma_{k,n-k}^2$$

In the case of discrete coordinates x and y, the infintely dimensioned Hilbert space becomes a finitely dimensioned linear vector space. Thus, there are also only finitely many coefficients $\gamma_{k,n-k}$. Their maximum number is the number of the data points occurring inside the window defined by A(x,y,s).

The coefficient $\gamma_{0,0}^2$, which represents the mean value, has a special role: In the Parseval theorem, it is frequently subtracted on both sides of the equation, which results in the variance being equal to the sum of the squared coefficients, apart from the 0th. If only a subset S of coefficients is used as approximate value, its sum in relation to the variance yields a value which is defined pointwise and is used as an objective measure Q of quality in the sense of the variance defined by the model.

$$Q = \frac{\Sigma_{(k,n) \in S} \gamma_{k,n-k}^2}{(\int\int (I(x, y) * A(x, y, s))^2 dx dy) - \gamma_{0,0}^2}$$

In the fingerprint model discussed above, only a single coefficient of fourth degree is used as a local image model with the optimum magnitude scale and the optimum direction. The squared value of this single coefficient is used as the local measure of quality. This measure of quality is normally much smaller than the maximum value of 1, because, even in the ideal case, in which parallel lines are present, the model structure decreases with increasing distance from the centre, while the ideal image is periodic. A measure of quality of 0.3 is enough to be regarded as excellent. On the other hand, none of the coefficients having the above-described properties will overshoot the measure of quality of 0.15 in response to a completely random signal. Consequently, a threshold value of 0.16 to 0.17 is a good lower bound for the hypothesis that a useful signal is present.

The typical local features of a fingerprint, the line ends and branchings, yield local minima of the measure of quality, because there are local errors in the model. Consequently, in order to describe the quality of these minutiae (MI), it is necessary to use an average value from their neighbourhood.

A similar problem occurs in the case of the global singularities (SI) of the fingerprint. By definition, no preferred direction which can be specified is present at these points. Consequently, the measure of quality of a rigid 1D-model will necessarily vanish at these points. However, quality is not a pointwise property, but a regional one. For this reason, the measure of quality is determined for an environment of suitable size. This also has the effect that, at locations at which special fingerprint features are present, there is no reduction in the measure of quality, although they disturb the ideal model.

The total algorithm will now be described more precisely with the aid of FIGS. 2 and 5 to 15. The concepts described are the core for the solution of the problems which attend the coding of fingerprints, the code of which is to be used in an automatically constructed database. The latter contains a few steps which can be classified:

Preprocessing for a global grey-scale value and contrast correction.

Determination of the preferred direction in the close environment of each pixel of the image.

Segmentation, for example by marking regions relevant for the identification.

Identification of singularities (SI) in the directional field.

Determination of global characteristics for the purpose of classification.

Determination and compression of minutiae (MI) from the filtered image.

These steps are discussed in detail below and explained in conjunction with the application of the model-based filtering discussed above.

Preprocessing

Figure 5:
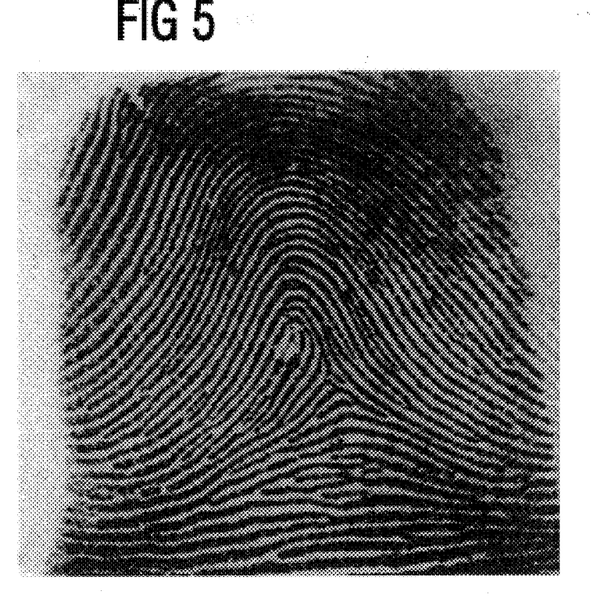
FIG. 5 shows an original fingerprint image.
Figure 6:
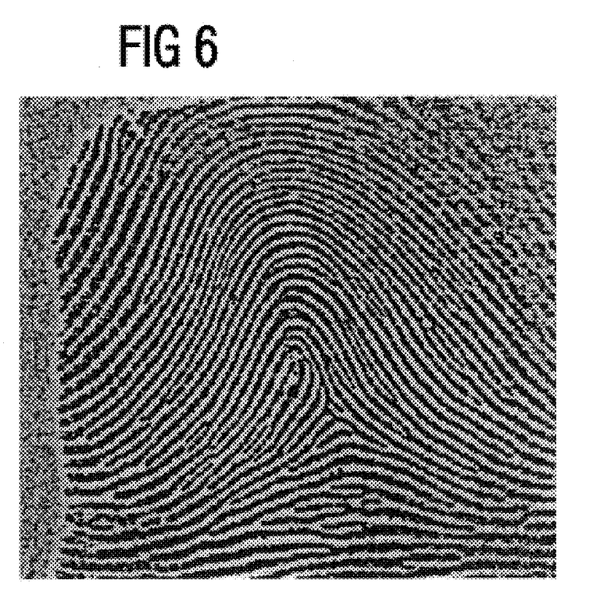
FIG. 6 shows a fingerprint image preprocessed by contrast enhancement and global grey-scale correction.

A fingerprint is digitized by a scanner in terms of grey-scale values which yield a typical, original image of the fingerprint, as shown in FIG. 5. Such an original image has large differences in brightness and contrast. These differences are compensated for the purpose of optimized further processing. For this purpose, a regional mean value is firstly determined and subtracted from the original image. The resulting image free of the mean value still has all the contrast differences. The latter are determined in a similar way as in the case of the human eye by means of a psuedologarithmic transformation, as is disclosed in "The psuedo-logarithmic transformation for robust displacement estimation", J. Dengler and M. Schmidt, R. E. Großkopf, editor, Mustererkennung (patent recognition) 1990, Informatik Fachberichte 254, pages 275–281, Berlin-Heidelberg-New York-Tokyo, 1990, Springer. The result of the two preprocessing steps is shown in FIG. 6. It supplies an optimum starting point for further analysis, because all the local contrasts are preserved and the weak contrasts are substantially enhanced.

Identification of the Preferred Direction in Each Pixel

The determination of the local preferred direction, which corresponds to the direction of the local linear/valley structure, is of great significance from many points of view in fingerprint analysis.

Firstly, a pixel of the preprocessed grey-scale image, including the pixels surrounding the selected pixel, is selected as the image section. As a rule, the two-dimensional image section comprises a region of 20*20 pixels. The selected image section is defined and weighted by means of the two-dimensional binomial function A(x,s).

As described above, this weighted image function is expanded in accordance with a discrete approximation of the orthonormal Cartesian eigenfunctions $\Phi_n(\xi)$ of the quantum-mechanical harmonic oscillator. In this case, because of the reasons mentioned above, only the family of 4th order is used. The remaining, less decisive coefficients are dispensed with for reasons of efficiency.

The algebraic rotation of the expansion coefficients is performed with the aid of the rotation theorem for Hermite polynomials. The Cartesian coefficients are thereby transformed into coefficients of the wavetrain base WB, as represented in FIG. 4. The square of the absolute value of these coefficients represents the degree of fit of each of the models, shown in FIG. 4, of the wavetrain base WB to the image section. The coefficient with the highest absolute value specifies the best-fitting wavetrain basis WB. A vector field approximation of the preferred direction is undertaken from this wavetrain base WB by means of smoothing and fitting the absolute values of the coefficients to periodic functions. The angle of best orientation and the quality of fit are determined from this approximation. The arc of the resulting vector coefficient, comprising two components, specifies the direction of the local linear orientation in the image section under consideration, and its absolute value specifies the local measure of quality.

The vector coefficient is stored in a memory, and a next pixel, for example neighbouring, is selected in order to determine the vector coefficients thereof. If the vector coefficients of all the pixels of the relevant image section are determined in this way, statistical errors in the orientations are greatly reduced by smoothing over a large are (averaging). The entire procedure is repeated for a further two magnitude scales. For each pixel, linear superposition is used to select the best-fitting wavetrain basic function, and thus the vector coefficient whose measure of quality with regard to direction and linear spacing is the greatest. The weighting ω of the individual contributions is yielded from the respective qualities $q_i$:

$$\omega_i = \frac{q_i}{\sum_i q_i}.$$

A field with the optimum scales can be stored in a memory MEM1 as a field. Information on the average linear spacing of the fingerprint can be further utilized later with the aid of this scale field.

Figure 9:
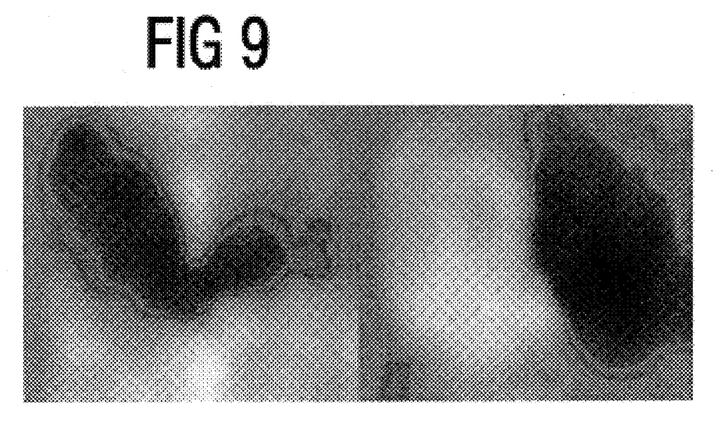
FIG. 9 shows a grey-scale representation of the field of the sine and cosine components of directional vectors.
Figure 10:
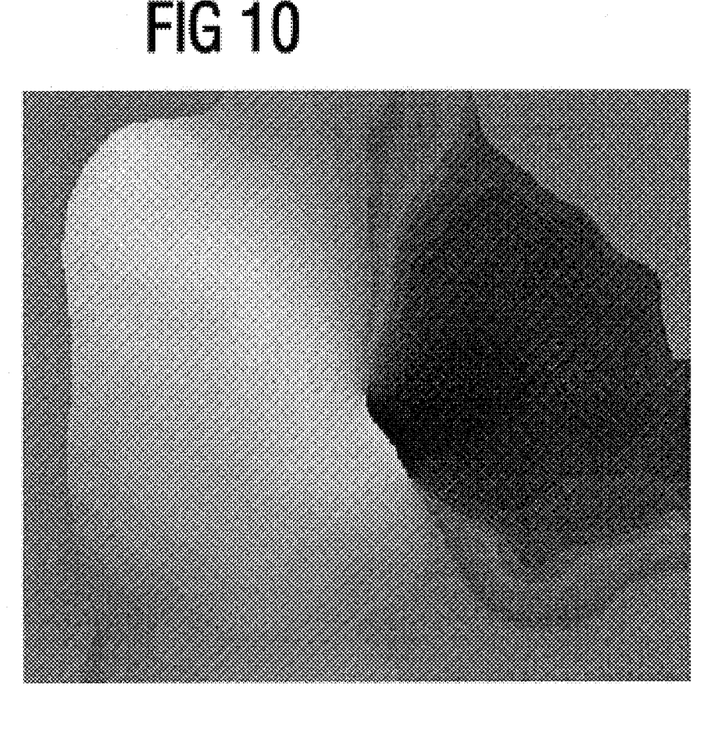
FIG. 10 shows a grey-scale representation of the field of the arc of direction vectors.

When a set of basic functions of fourth order on three different magnitude scales, which cover the possible range of spacings between the lines, is used, the projections of the operator responses onto the cosine and sine components produce the field of directional vectors which is coded in grey-scale values in FIG. 9. It is clear that this is a vector field having a range of 180°, which means that a rotation of 180° has no effect on any of the components. The arc of this vector field specifies the actual direction, as it is represented by grey-scale coding of the angle in FIG. 10. It is to be noted that white and black represent the same angle of 0°. The directional field, which is stored in a memory, is the most important information source for the global characterization of the fingerprint.

Figure 7:
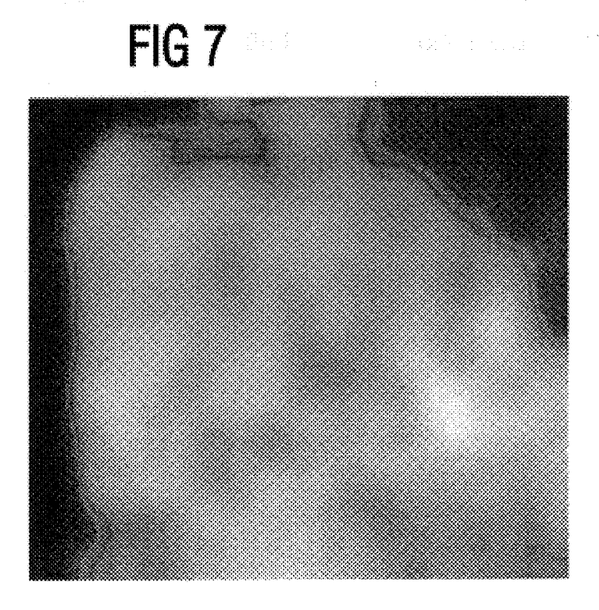
FIG. 7 shows a grey-scale representation of a distribution of the image quality.

A quality map, which is shown as a grey-scale image in FIG. 7 and stored in a memory, is formed from the absolute value of the directional vectors. It is possible with the aid of this quality map to obtain various findings on the image of the fingerprint which are helpful for classification purposes.

Figure 8:
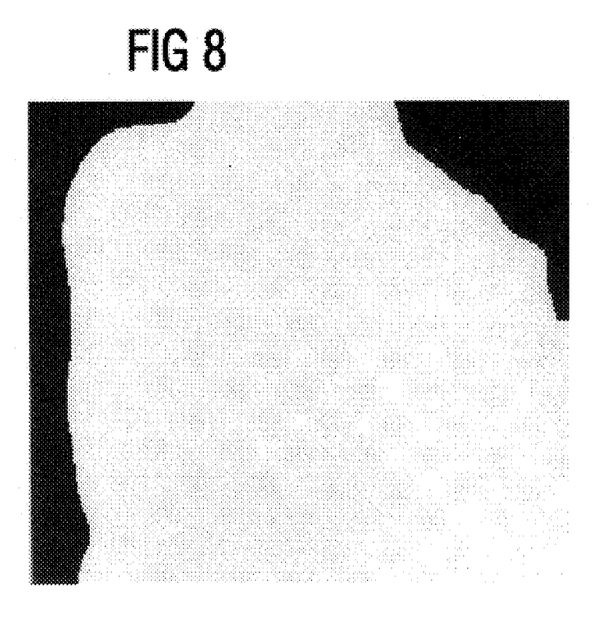
FIG. 8 shows a grey-scale representation of the result of the segmentation of the fingerprint image.

An important task in the identification of a real fingerprint is the separation of the actual fingerprint from its environment. The relevant image region can be determined with the aid of threshold-value treatment of the quality map. The maximum random quality of 0.15 is used as threshold value, that is to say, if the absolute value of the quality is greater than 0.15, there is present in the case of the pixel under consideration a structure which points to the presence of a fingerprint. The result of this threshold-value treatment is a segmentation map, as shown in FIG. 8.

Since the quality map is smoothed, the region of good quality is coherent, or has at least large coherent regions. It can be seen that the segmentation acts in a way similar to human intuition.

The directional image is masked by the segmentation result, in order to avoid further processing of interfering properties such as, for example, background noise.

Determination of Singularities (SI) From the Directional Field

Figure 11:
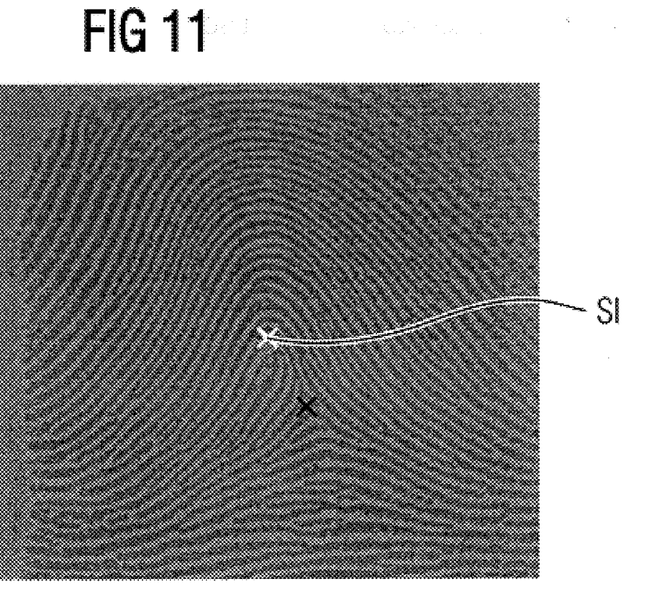
FIG. 11 shows a grey-scale representation of singularities in the fingerprint image.

There are two different types of noteworthy points in the directional field. These special points, also termed singularities (SI), do not have a well-defined direction. The singularities (SI) can be characterized by the standardized integral of the angular variation in the environmental field, which can be interpreted as topological loading. The theorem on winding numbers from the functional theory is applied, as described, for example, in "Analysing Oriented Patterns", M. Kass, A. Witkin, Computer Vision, Graphics and Image Processing, pages 362 to 385, 1987. The most important singularities (SI) are the core regions, with a winding number 0.5 having a positive sign, and the delta regions, with a winding number 0.5 having a negative sign. FIG. 11 shows the automatically determined singularities SI in the original image of the fingerprint.

In regions of undefined alignment, false singularities SI can be determined by mistake. These are eliminated by a statistical test for each singularity SI. In order to arrive at a positive test result, there must be an adequate amount of direction-specific information in a close environment of a putative singularity SI. The nature of the singularities SI, their coordinates and spacings from one another are stored in a memory MEM1. When specifying the spacing, use is made of the length unit of "line number" (ridgecount) which specifies the number of the lines between the singularities SI.

One core category, the arcuate cores, does not actually correspond to the singularities SI in the directional field. They are characterized by a type of elevation. Such singularities SI are treated by a special procedure. In this procedure, the directional field and the quality map are used to set an arcuate core at the points at which a maximum is present in the line curvatures and there is good right/left symmetry.

Model-based Reconstruction

Figure 12:
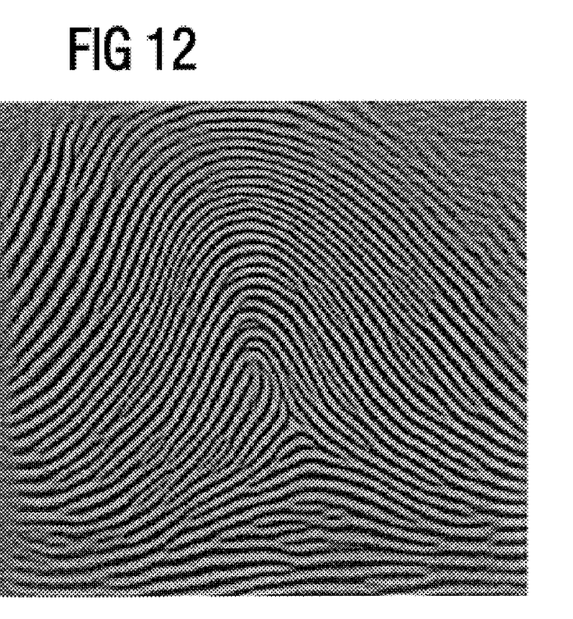
FIG. 12 shows a grey-scale representation of the filtered fingerprint image.

A central starting point in the reliable analysis of fingerprint image information is the filtering process which is required in order to exclude false features and in order to find the correct ones. The approach to this is model-based; the image is actually reconstructed by linear superposition of the best-fitting wavetrain basic function of fourth order. The result is an idealized reconstruction of the linear/valley structure, as shown in FIG. 12. Well reconstructed regions exhibit strong contrast, while in the case of less well constructed regions weaker contrast is present.

Feature Extraction

The aim and purpose of fingerprint analysis is to achieve reliable extraction of minutiae MI. These unchanging line ends and branchings are of central significance in the identification of a person.

Figure 13:
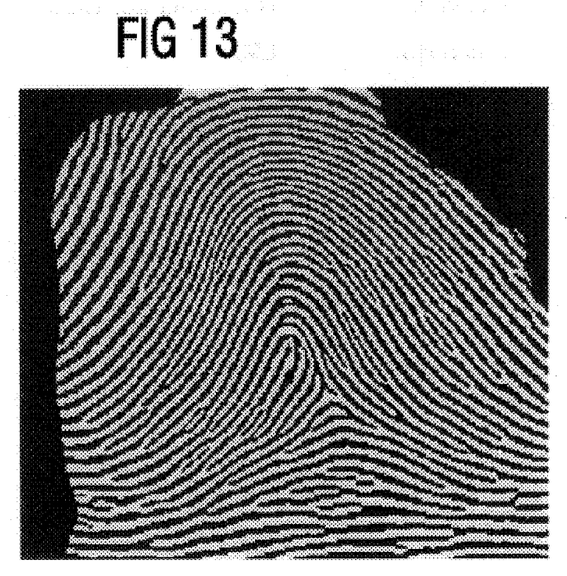
FIG. 13 shows a binary representation of the filtered fingerprint image.

Starting from the above-described model-based reconstruction, the rest of the method is trivial. Owing to the fact that all the operators of first and higher order have an arithmetic mean of zero, the optimum threshold value for the creation of a binary image is zero. For example, white is set for functional values of the reconstruction image which are greater than zero, and black is set for functional values which are less than zero. The masked binary reconstruction in accordance with FIG. 13 shows the excellent quality of the method represented.

Outlining

Figure 14:
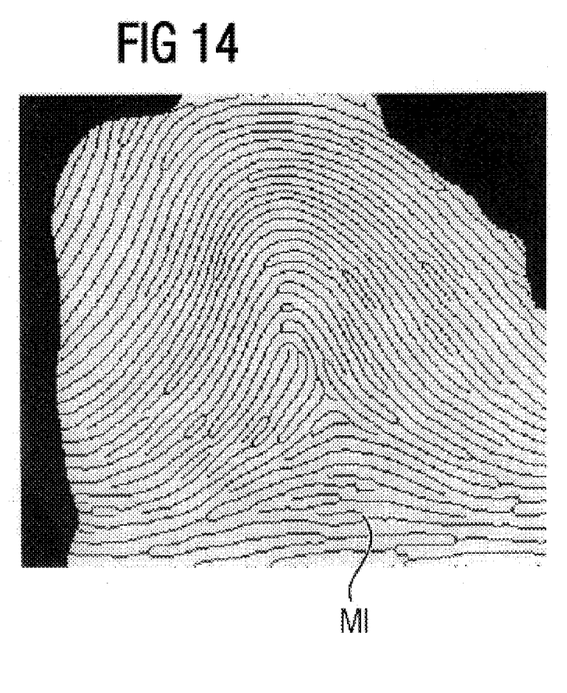
FIG. 14 shows a binary representation of the outlined fingerprint image.

An applicable method for outlining is disclosed, for example, in "Morphologische Bildverarbeitung in der Zellenanalyse" ("Morphological image processing in cell analysis"), M. Schmidt, Technical Report 9-2/88, Deutsches Krebsforschungszentrum Heidelberg/DE (German Cancer Research Centre, Heidelberg), Medizinische und Biologische Informatik, 1988. The aim of outlining is to generate lines of pixel width, as shown in FIG. 14. For this purpose, the line width is reduced in steps to the width of a pixel, without changing the topological context.

Line ends and branchings can be determined in a simple way from the outlined binary image by a simple 3×3 pixel pattern comparison method (template matching). Short line segments resulting from the outlining method and having ends are subsequently removed. The fingerprint features designated as minutiae MI are stored in the form of a list of coordinates, direction, type and quality.

Figure 15:
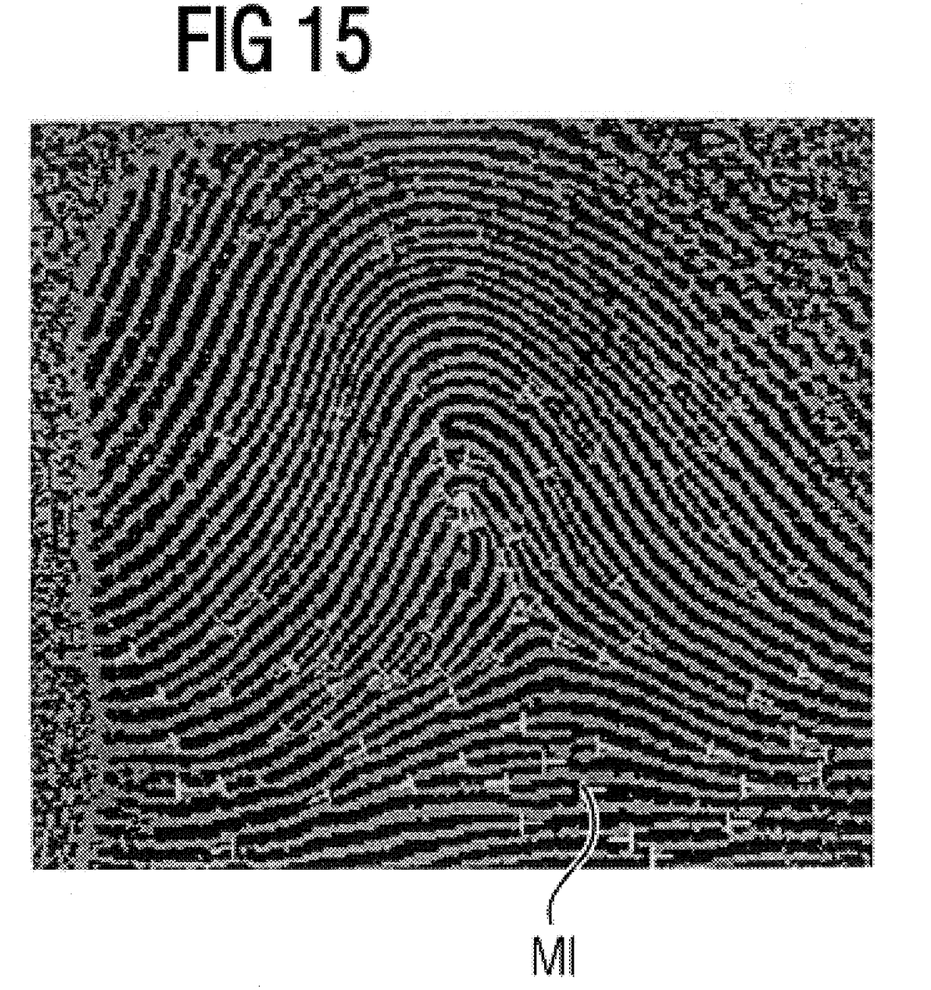
FIG. 15 shows a binary representation of a result of coding, including global singularities.

As a result of the coding method, copious information on the fingerprint is available. This result is represented in FIG. 15, in which the global singularities SI and the minutiae MI are marked. The items of information represented by the image are ordered and conditioned for the comparator MT in a manner which is not represented, and stored in the memories MEM, MEM1.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A method for reconstructing linear structures present in raster form, comprising the steps of:
    (a) selecting an image section, arranged around a pixel, from a linear-structure image which is present in pixel form and digitized in terms of grey-scale values of gray-scale information;
    (b) locally simulating the grey-scale information using a one-dimensional basic function $\Psi_n(x,s)$, which is brought into relation with a two-dimensional weighted binomial function $A(x,s)$ that defines the image section, using:

$$\Psi_n(x, s) = \left(\frac{1}{\sqrt{4s}}\right)^n \Phi_n(\xi) A(x, s)$$

(c) determining a preferred direction, present for the selected pixel in conjunction with an environment thereof, of the lines running through the image point, by
        (c)(i) expanding the basic function $\Psi_n(x,s)$, which is a Gauss-weighted derivation operator, according to a discrete approximation using binomials, according to the relation $s=m/2$, where s is a continuous scale parameter of a Gauss core and m is a discrete order of the binomial,
        (c)(ii) selecting an expansion coefficient of an order that enables a good approximation of the basic function to the grey-scale information,
        (c)(iii) algebraically rotating the expansion coefficients using a rotation theorem for Hermite polynomials, so that cartesian coefficients are transformed into coefficients of a wave train base,
        (c)(iv) adapting coefficient absolute values to periodic function of models of a wave train base,
    (d) storing the result, which contains a vector coefficient with two components, as a directional distribution in a memory, and
    (e) selecting a next pixel and repeating steps (a) to (d) until the directional distribution of the pixels of the linear structure is stored in the memory.

2. The method according to claim 1, wherein a statistical smoothing of the vector coefficients determined is carried out using averaging.

3. The method according to claim 1, wherein the method is repeated using at least a second binomial function which is assigned to a different magnitude scale describing line spacings.

4. The method according to claim 3, wherein with a selection of respectively best-fitting basic function, and thus of the vector coefficient, whose quality measure q with respect to direction and line spacing is greatest, and weighting by production of a weighting function $$\omega_i = \frac{q_i}{\sum_i q_i}$$

of the individual absolute values, whereby the respective selection result is stored in a memory as a grey-scale image and as a directional distribution.

5. The method according to claim 1, wherein the absolute value of each vector coefficient is formed and is stored as a quality map that visualizes the quality of a reconstruction of a linear structure.

6. The method according to claim 5, wherein, with segmentation of a reconstruction result by threshold-value treatment of the quality map, all pixels having a quality which is higher than a threshold value are assigned to a valid linear structure.

7. The method according to claim 1, wherein, with determination of singularities from a stored directional distribution with formation of a normed integral of angular change of an environmental field.

8. The method according to claim 7, wherein the method further comprises checking of existing vector coefficients in an environment of a singularity and storing data for finding a singularity recognized as authentic.

9. The method according to claim 1, wherein the method further comprises reconstructing all pixels from a grey-scale image to form a binary image by setting a limiting value for distinguishing between white and black at a grey-scale value of 0.

10. The method according to claim 8, wherein the method further comprises outlining of a binary image so that a line width is reduced in steps to a width of a pixel.

11. The method according to claim 10, wherein the method further comprises:
sequentially selecting pixel image sections, of size 3×3 pixels each, from the outlined binary image,
comparing said pixel image sections with pixel patterns of a common size which contain branchings or line ends, and
storing image point coordinates for a positive result of comparison.

12. The method according to claim 11, wherein the method further comprises evaluating the reliability of a found minutia using quality measures, stored in the quality map, in an environment of each minutia.

13. A device for reconstructing linear structures present in raster form comprising:
system for selecting an image section, arranged around a pixel, from a linear-structure image which is present in pixel form and digitized in terms of grey-scale values;
system for local simulation of the grey-scale information using a one-dimensional basic function $\Psi_n(x,s)$ that defines the image section, which is brought into relation with a two-dimensional weighted binomial function $A(x,s)$ using:

$$\Psi_n(x,s) = \left(\frac{1}{\sqrt{4s}}\right)^n \Phi_n(\xi) A(x,s)$$

system for determining a preferred direction, present for the selected pixel in conjunction with an environment thereof, of the lines running through the image point, by,
expanding the basic function $\Psi_n(x,s)$, which is a Gauss-weighted derivation operator, according to a discrete approximation using binomials, according to the relation $s=m/2$, where s is a continuous scale parameter of a Gauss core and m is a discrete order of the binomial,
selecting an expansion coefficient of an order that enables a good approximation of the basic function to the grey-scale value information,
algebraically rotating the expansion coefficients using rotation theorem for Hermite polynomials, so that certesian coefficients are converted into coefficients of a wave train base WB,
adapting the coefficient absolute values to the periodic function of models of a wave train base,
system for storing the result, which contains a vector coefficient with two components, as a directional distribution in a memory, and
system for repeatedly selecting and processing a next pixel until the directional distribution of the pixels of the linear structure is stored in the memory.

14. The device according to claim 13, wherein the device further comprises, smoothing the vector coefficients determined using averaging.

15. The device according to claim 13, wherein the device further comprises a system for repetition of method steps by at least a second binomial function which is assigned to a different magnitude scale describing line spacings.

16. The device according to claim 15, wherein the device further comprises a system for selecting a respectively best-fitting basic function, and thus of the vector coefficient, whose quality measure q with respect to direction and line spacing is greatest, and weighting by production of a weighting function $$\omega_i = \frac{q_i}{\sum_i q_i}$$

of the individual absolute values, whereby a respective selection result is stored in a memory as a grey-scale image and as a directional distribution.

17. The device according to claim 13, wherein the device further comprises system elements for forming the absolute value of each vector coefficient and for storage in a form of a quality map that visualizes a quality of reconstruction of a linear structure.

18. The device according to claim 17, wherein the device further comprises a system for segmenting the reconstruction result by threshold-value treatment of the quality map, wherein all pixels having a quality which is higher than a threshold value are assigned to a valid linear structure.

19. The device according to claim 13, wherein the device further comprises a system for determining singularities from the stored directional distribution, with formation of normed integral of angular change of an environmental field.

20. The device according to claim 19, wherein the device further comprises a system for checking existing vector coefficients in an environment of a singularity recognized as authentic.

21. The device according to claim 13 wherein the device further comprises a system for reconstructing all pixels from a grey-scale image to form a binary image by setting the limiting value for distinguishing between white and black at a grey-scale value of 0.

22. The device according to claim 20, wherein the device further comprises a system for outlining of a binary image so that a line width is reduced in steps of a width of a pixel.

23. The device according to claim 22, wherein the device further comprises:
a system for sequential selection of pixel image sections, of size 3×3 pixels each, from the outlined binary image,
comparison of these pixel image sections with pixel patterns of a common size which contain branchings or line ends, and
storage of image point coordinates for a positive result of comparison.

24. The device according to claim 23, wherein the device further comprises a system for evaluating releabilty of a found minutia using quality measures, stored in the quality map, in an environment pf each minutia.

25. The method according to claim 1, wherein the linear structures are fingerprints.

26. The device according to claim 13, wherein the linear structures are fingerprints.

* * * * *